July 7, 1970 C. E. PALMER 3,519,193
TEAR TAPE CONSTRUCTION
Filed Sept. 16, 1968
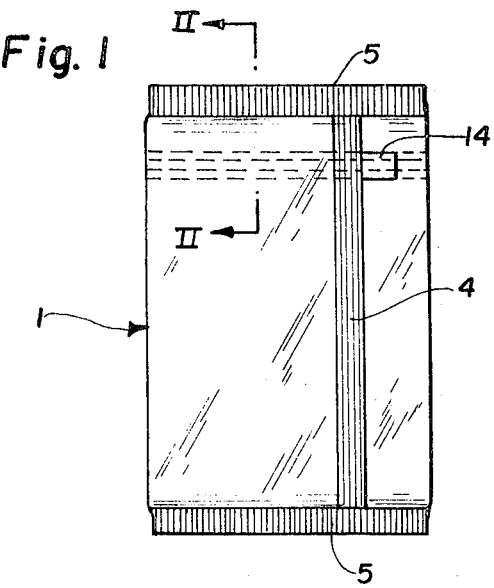
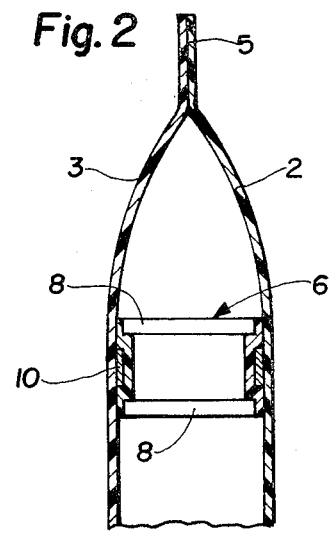
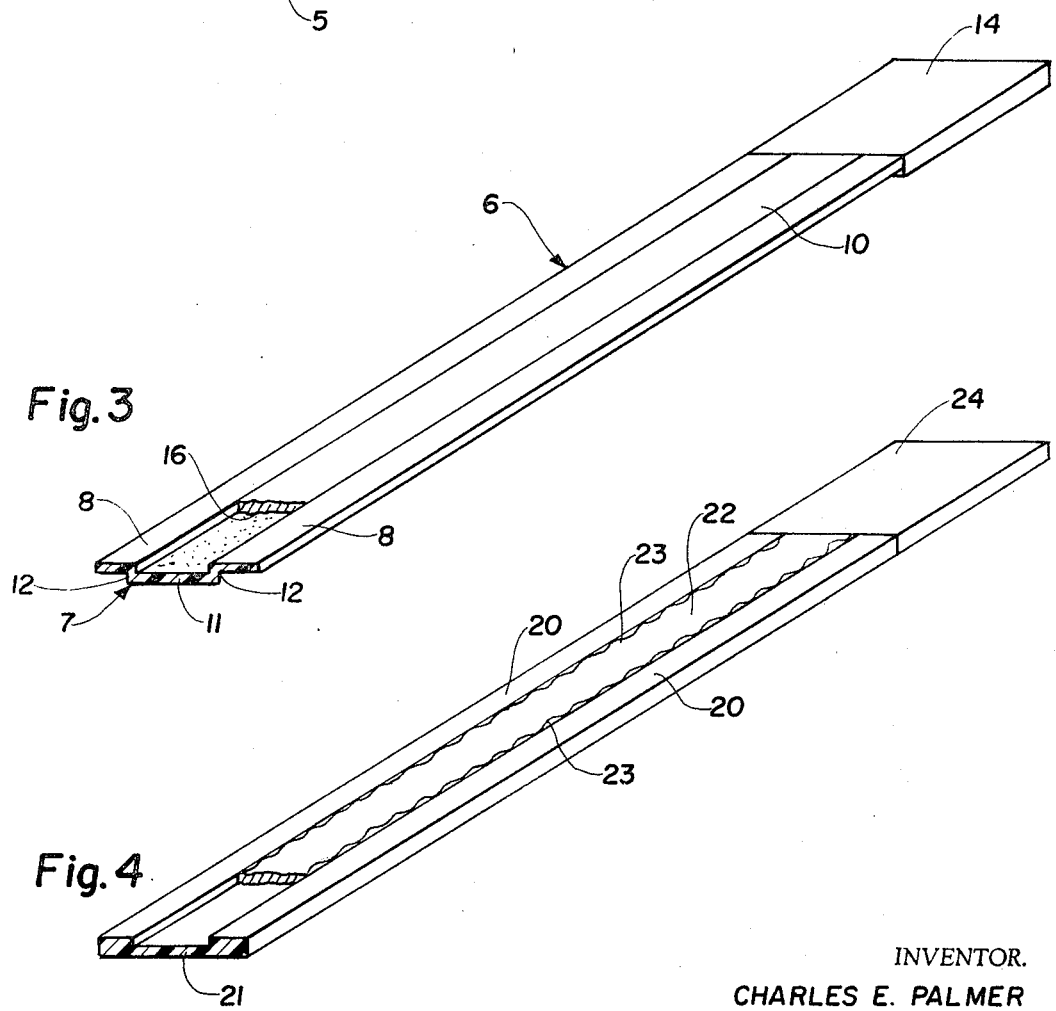
INVENTOR.
CHARLES E. PALMER
BY
ATTORNEY овать
United States Patent Office 3,519,193
Patented July 7, 1970

3,519,193
TEAR TAPE CONSTRUCTION
Charles E. Palmer, Somers, Conn., assignor to Jones & Laughlin Steel Corporation, Pittsburgh, Pa., a corporation of Pennsylvania
Filed Sept. 16, 1968, Ser. No. 762,174
Int. Cl. B65d 17/20
U.S. Cl. 229—51                                     10 Claims

ABSTRACT OF THE DISCLOSURE

Tear tapes for packages made of plastics, paper, paper-plastic laminates and like materials are disclosed. The tapes comprise a flexible plastic strip having a longitudinally extending recessed central portion bounded on each side by a raised longitudinally extending side margin and a steel foil band having sharp cutting edges positioned within the recessed central portion of the strip.

---

This invention relates generally to opening means for packages such as paper, plastic or plastic-coated bags and more specifically to the use of tear tapes as the opening means.

The packaging of products in packages made of heavy paper, plastics and paper-plastic laminates is of commercial significance. Various kinds of plastics are employed, including polyethylene, polyvinylidene chloride and cellulose acetate. One reason packages constructed of these materials have found widespread use is because they are tough and durable. At the same time, however, their toughness and durability make it difficult to tear them open when their contents are to be removed.

According to the present invention, I provide an opening means in the form of a tear tape for packages constructed of heavy paper, plastics, paper-plastic laminates and like materials. The tear tape comprises a flexible plastic strip having a longitudinally extending recessed central portion in the form of a slot, bounded on each side by a raised longitudinally extending side margin and a steel foil band positioned within the slot and firmly secured to the plastic strip. The tear tape is attached to the package so that the package can be opened by grasping a tab provided at one end of the tear tape and pulling the tape away from the package, causing the sharp edges of the steel foil band to cut through the package. As the package is torn open in this manner and the steel foil band passes to the outside of the package through the opening so made, the band pulls the plastic strip along with it, whereby the sharp cutting edges on the emerging steel foil band are covered by the plastic strip, thus eliminating the risk of persons handling the tape cutting themselves on said edges. The plastic strip also serves to protect the steel foil band from corrosion.

It is an object of the present invention to provide opening means in the form of a tear tape for packages constructed of heavy paper, plastics, paper-plastic laminates and like materials.

Another object of the present invention is to provide such a tear tape incorporating a steel foil band having sharp cutting edges, thereby providing for a positive, controlled tearing-open of the containers.

Yet another object of the invention is to provide such a tear tape including flexible plastic strip means cooperating with the steel foil band to shield the sharp cutting edges of the latter so as to prevent persons handling the tape from cutting themselves and to protect the tape from corrosion.

These and other objects and advantages of the invention will become apparent from the following descriptions of embodiments thereof with reference to the accompanying drawing in which:

FIG. 1 is a rear elevational view of a bag constructed of polyethylene and incorporating a tear tape according to a first embodiment of the present invention.

FIG. 2 is an enlarged sectional view along line 2—2 of FIG. 1.

FIG. 3 is an enlarged perspective view, with parts broken away, of a tear tape of the type shown in FIGS. 1 and 2.

FIG. 4 is an enlarged perspective view, with parts broken away, of a tear tape according to a second embodiment of the invention.

Referring to FIGS. 1 and 2 of the drawing, the bag, indicated generally at 1 and constructed from a polyethylene film, comprises a front panel 2 and a rear panel 3. In forming the bag, overlapping sides of the polyethylene sheet from which it is made are heat sealed to form a longitudinal seam 4, and the top and bottom ends of the front and back walls are similarly heat sealed to form seams 5—5.

The tear tape, indicated generally at 6, is fastened to the inside of the bag with one end projecting outside the bag at seam 4 so as to provide a plastic-coated tab 14 which can be readily gripped. As best seen in FIG. 3, the tear tape comprises a flexible strip of plastic material such as polyethylene and has a longitudinally extending central portion 7 bounded by longitudinally extending side margins 8—8. The central portion of the strip is recessed from the two side margins to provide a slot in the strip and a steel foil band 10 is positioned within the slot. The depth of the slot is substantially equal to the thickness of the steel foil band so that the upper surfaces of the side margins are substantially flush with the upper surface of the steel foil band. The latter is about .002 to .006 inch thick.

The recessed central portion 7 of the strip includes base web 11 and parallel side webs 12—12 extending substantially perpendicularly in the same direction from respective edges of the base web. The two side margins 8—8 of the strip comprise web elements which are integral with respective ones of the side webs 12—12. The side margins extend substantially perpendicularly from the side webs 12—12 outwardly of the slot.

The steel foil band 10 is securely attached to the plastic strip by means of an adhesive 16 placed between the band and base web 11. The tear tape is attached to the inside of bag 1 by lightly tacking side margins 8—8 to the bag by means of an adhesive or in any other suitable manner. The tear tape is only lightly secured to the bag so that it can easily break free as the tear tape tears open the bag.

To open the bag, pull tab 14 is grasped and pulled across the bag from right to left as it is illustrated in FIG. 1. The plastic strip is flexible enough to flex away from the steel foil band as pulling pressure is applied to the tape and permit the sharp edges of the band to come into good contact with the bag and tear an opening therein. As the steel foil band emerges from the opening so made it pulls the plastic strip, to which it is adhesively secured as described, along with it and once through the opening, the plastic strip returns to its original position and configuration, shielding the sharp edges of the band and preventing persons handling the tear tape from cutting themselves thereon.

In the embodiment of the invention illustrated in FIG. 4, the longitudinally extending side margins 20—20 of the flexible plastic strip are of a greater thickness than the longitudinally extending recessed central portion 21 of the strip to provide a slot within which steel foil band 22 having serrated cutting edges 23—23 rests. Plastic pull tab 24 is provided at one end of the tape as a means for grasping the tape in opening packages.

I claim:

1. A tear tape comprising a flexible strip having a longitudinally extending central portion bounded by two longitudinally extending side margins, said central portion being recessed from said side margins to provide a slot in said strip, a steel foil band positioned within said slot, the depth of the slot beng substantially equal to the thickness of the steel foil band.

2. The tear tape of claim 1 wherein the steel foil band has serrated edges.

3. The tear tape of claim 1 wherein the steel foil band is about .022 to .006 inch thick.

4. The tear tape of claim 1 wherein said recessed central portion of the strip comprises a base web and two parallel side webs extending substantially perpendicularly in the same direction from respective edges of said base web, the two side margins of the strip comprising web elements integral with respective ones of said side webs and extending susbtantially perpendicularly therefrom outwardly of said slot.

5. The tear tape of claim 4 wherein the steel foil band is about .002 to .006 inch thick.

6. In combination with a package made of a material selected from the group consisting of plastics, paper and paper-plastic laminates, a tear tape comprising an elongated flexible plastic strip having a longitudinally extending central portion bounded by two longitudinally extending side margins, said central portion being recessed from said side margins to define a slot in said strip, a steel foil band positioned within said slot, the depth of the slot being substantially equal to the thickness of the steel foil band, said tear tape being lightly fastened to said package along said side margins whereby upon opening of the package by means of the tear tape, the elongated flexible plastic strip emerges from the opening along with the steel foil band.

7. The combination of claim 6 wherein the steel foil band has serrated edges.

8. The combination of claim 6 wherein the steel foil band is about .002 to.006 inch thick.

9. The combination of claim 6 wherein said recessed central portion of the strip comprises a base web and two parallel side webs extending substantially perpendicularly in the same direction from respective edges of said base web, the two side margins of the strip comprising web elements integral with respective ones of said side webs extending substantially perpendicularly therefrom outwardly of said slot.

10. The combination of claim 9 wherein the steel foil band is about .002 to.006 inch thick.

References Cited

UNITED STATES PATENTS

| | | | |
|---|---|---|---|
| 2,141,252 | 12/1938 | Prindle | 229—51 |
| 2,998,840 | 9/1961 | Davis | 161—145 |
| 3,193,049 | 7/1965 | Wollek | 161—145 X |
| 3,426,959 | 2/1969 | Lemelson | 229—66 X |

DAVID M. BOCKENEK, Primary Examiner

U.S. Cl. X.R.

229—66; 206—59